(12) United States Patent
Reckless

(10) Patent No.: US 8,332,884 B2
(45) Date of Patent: Dec. 11, 2012

(54) APPARATUS FOR AND A METHOD OF PROVIDING CONTENT DATA

(75) Inventor: Jonny Boyd Reckless, Reading (GB)

(73) Assignee: Rovi Solutions Corporation, Santa Clara, CA (US)

( * ) Notice: Subject to any disclaimer, the term of this patent is extended or adjusted under 35 U.S.C. 154(b) by 797 days.

(21) Appl. No.: 12/070,592

(22) Filed: Feb. 20, 2008

(65) Prior Publication Data

US 2009/0210894 A1    Aug. 20, 2009

(51) Int. Cl.
*H04N 7/16* (2011.01)
*H04N 7/10* (2006.01)

(52) U.S. Cl. .......................... 725/28; 725/32

(58) Field of Classification Search ............ 725/28, 725/32
See application file for complete search history.

(56) References Cited

U.S. PATENT DOCUMENTS

| | | | |
|---|---|---|---|
| 6,611,624 B1 * | 8/2003 | Zhang et al. | 382/232 |
| 2002/0191950 A1 | 12/2002 | Wang | |
| 2005/0226325 A1 * | 10/2005 | Dei et al. | 375/240.12 |
| 2006/0031892 A1 | 2/2006 | Cohen | |
| 2009/0097572 A1 * | 4/2009 | Connery et al. | 375/240.26 |

FOREIGN PATENT DOCUMENTS

| | | |
|---|---|---|
| JP | 2002-290878 | 10/2002 |
| KR | 10-0800405 | 2/2008 |

OTHER PUBLICATIONS

International Search Report for International application No. PCT/US2009/000997 mailed Aug. 7, 2009, 1 page.

* cited by examiner

*Primary Examiner* — Pankaj Kumar
*Assistant Examiner* — Franklin Andramuno
(74) *Attorney, Agent, or Firm* — Morrison & Foerster LLP

(57) ABSTRACT

Advertising data is incorporated into predictively encoded, for example MPEG encoded, digital video representing a video feature such as a film or movie or television show or program or video game by re-encoding one or more sequences or groups of pictures of the video feature with reference to at least one frame of advertising data representing at least one advertisement so that the sequence of the video feature cannot be decoded without decoding the advertising data, thereby making it difficult, when the video feature is delivered to an end user by, for example, downloading or streaming over a network, for the end user to skip or delete the at least one advertisement from the video feature, without detrimentally affecting the video feature.

14 Claims, 5 Drawing Sheets

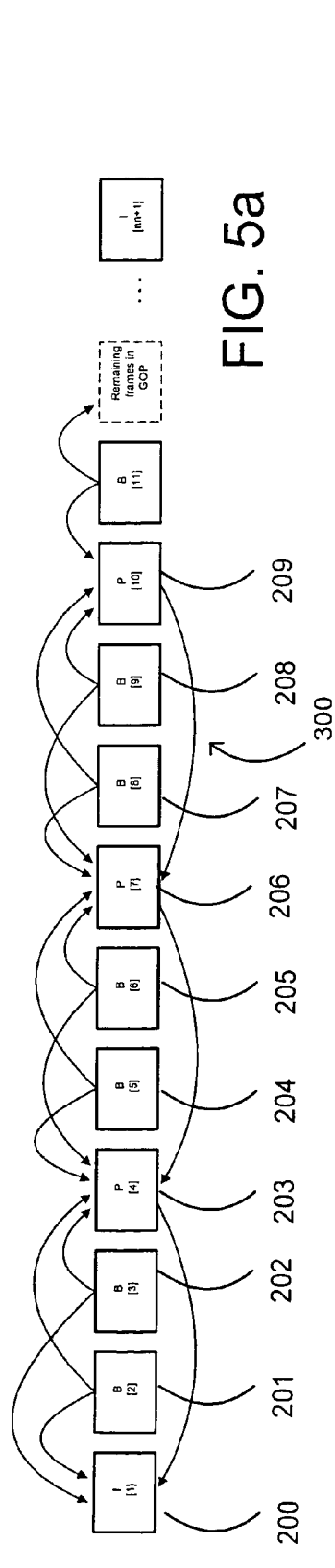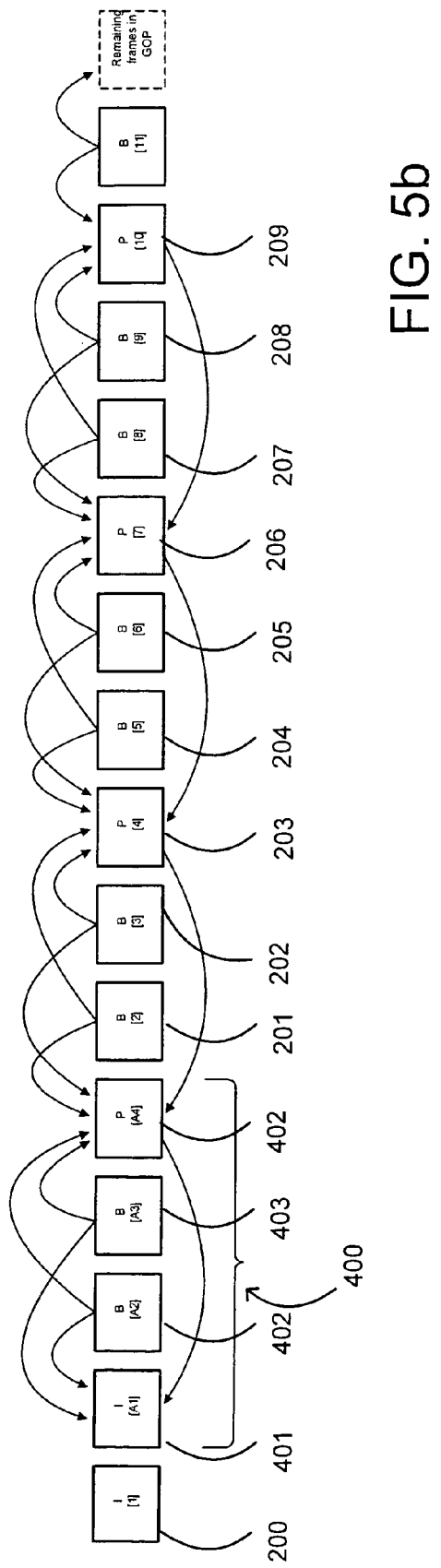
FIG. 5a
FIG. 5b

APPARATUS FOR AND A METHOD OF PROVIDING CONTENT DATA

FIELD OF THE INVENTION

This invention relates to an apparatus for and a method of providing content data.

BACKGROUND OF THE INVENTION

Content data, such as video data representing a video feature such as a television show or programme, film, movie or the like, may be supplied to a media centre of an end user or viewer as a free-to-air broadcast or as encrypted broadcast to be decrypted by a set top box or the like of the end user. Such content data may also be delivered to an end user on a recording medium such as a DVD or may be streamed to or downloaded by the end user via the Internet or other network (for example a telecommunications network) via TCP/IP, UDP or other appropriate network protocols.

There are several business models by which content data may be delivered, including purchase, rental, periodic, e.g. monthly, subscription and advertisement-supported. Advertisement-supported content data delivery where the content is free at the point of delivery, but the end user or viewer is subjected to periodic advertisements, is similar to traditional broadcast commercial television in which a video feature is periodically interrupted by advertisements. Moreover, advertisement-supported content data delivery does not require personal detail gathering or any credit card transactions to enable the service. For these reasons, advertisement-supported content data delivery may be more immediately acceptable to the end user or consumer.

One problem with advertisement-supported content data delivery is that it may be difficult to ensure that the end user actually experiences the advertisement because they may simply the skip over the advertisements by 'jumping' in nonlinear time using a personal video recorder (PVR) or media centre computer software or cut out the advertisements from previously downloaded content data. For example, many hard disk based television receivers have a recording buffer to permit the user to pause live television and, provided there is sufficient data in this buffer, it is possible to 'skip' any advertisements which are presented during the programme. The possibility that the end user may be able to avoid experiencing the advertisements will of course reduce the value to the advertiser and thus the revenue that the content data deliverer can derive from the advertiser.

SUMMARY OF THE INVENTION

An embodiment provides apparatus for and a method of providing encoded data to be decoded for playing by a player, wherein the encoded data contains both content data and advertising data and wherein part of the content data is encoded by reference to at least some of the advertising data so that the player cannot decode the part of the content data without the advertising data. Generally the data will be perceptually encoded digital video data (for example encoded using a lossy compression scheme such as MPEG2, MPEG4, DivX, Xvid, H.264, AVC, WMV or similar) representing a video feature such as a film or movie or a television show or a short form video entertainment clip.

An embodiment provides apparatus for and a method of providing encoded data such as video data, comprising a series of frames such as a group of pictures (GOP) wherein at least some of the frames are differentially encoded with respect to one or more other frames, wherein the encoded data contains both content data and advertising data and wherein a sequence of frames of the content data is differentially or predictively encoded by reference to at least one frame of the advertising data so that a player cannot decode (and so play to an end user) the sequence of frames of the content data without the at least one frame of advertising data. In an embodiment, the frames of advertisement data are inserted immediately following an independently encoded frame of the sequence of frames so as to maximize the number of frames of the series of frames of the content data for which decoding relies on the advertisement data. The frame of the advertisement data used to encode subsequent frames of the sequence of frames may be an independently encoded frame of the advertising data or a differentially or predictively encoded frame, where differential or predictively encoding means that the data that for that frame represents the difference between that frame and one or more reference frames. A differentially or predictively encoded frame may be encoded with reference to an earlier reference frame or to both earlier and later reference frames where such a reference frame may be an independently encoded frame or a differentially encoded frame. Using a differentially encoded frame of the advertising data means that both that differentially encoded frame and the or each frame with respect to which that frame was differentially encoded are required to enable decoding of the content data. An independently encoded frame may, in at least some encoding processes, be known as an Intra (I) frame while a differentially or predictively encoded frame encoded with reference to an earlier frame may be known as a Predicted (P) frame and a differentially or predictively encoded frame encoded with reference to both earlier and later frames may be known as a Bidirectional Predicted (B) frame.

In one aspect, the present invention provides apparatus for providing encoded video data, the apparatus comprising:

a content data receiver to receive video content data comprising a first sequence of frames having a first content data frame and a series of further content data frames directly or indirectly encoded with reference to the first content data frame;

an advertising data receiver to receive video advertising data comprising a second sequence of advertising data frames having a first advertising data frame and a series of further advertising data frames directly or indirectly encoded with reference to the first advertising data frame;

a decoder to decode the series of further content data frames to provide a series of decoded further content data frames; and an encoder to encode the series of decoded further content data frames with reference to at least one of the advertising data frames so that the player cannot decode the first sequence of frames without decoding the at least one frame of advertising data.

The first sequence of frames is generally a group of pictures (GOP). Each of the first and second sequences of frames may comprise at least one independently encoded frame and at least one predictively encoded frame encoded with respect to one earlier frame of the same sequence and the encoder may be operable to encode the decoded content data frames with respect to the at least one predictively encoded frame of the advertising data.

Each of the first and second sequences of frames may comprise at least one bidirectionally predictively encoded frame encoded with respect to at least one earlier frame and at least one later frame of the same sequence.

The first frames of the first and second sequences of frames may each comprise an I-frame and the series of further frames may each comprise at least one P-frame and at least one B-frame and the encoder may be operable to encode the decoded content data frames with respect to the at least one P-frame of the advertising data. The series of further content data frames may comprise a repeating pattern of P- and B-frames and the series of further advertising data frames may comprise the same or a similar pattern.

In one aspect, the present invention provides a method of providing encoded data such as digital video data to be decoded for playing by a decoder of a player, the method comprising:

combining content data and advertising data; and encoding at least part of the content data with reference to at least some of the advertising data to produce modified content data so that the player cannot decode that part of the content data without decoding the advertising data. Generally, the content data and advertising data will already be encoded and the method will further comprise decoding the at least part of the content data prior to encoding the at least part of the content data with reference to at least some of the advertising data.

In an embodiment, the method further comprises delivering a video feature incorporating the modified content data to an end user by way of at least one of: transmission; supply over a network; a recording medium.

In one aspect, the present invention provides a processor-readable storage medium storing processor instructions to program a processor:

to receive video content data comprising a first sequence of frames having a first content data frame and a series of further content data frames directly or indirectly encoded with reference to the first content data frame;

to receive video advertising data comprising a second sequence of advertising data frames having a first advertising data frame and a series of further advertising data frames directly or indirectly encoded with reference to the first advertising data frame;

to decode the series of further content data frames to provide a series of decoded further content data frames; and to encode the series of decoded further content data frames with reference to at least one of the advertising data frames so that a player cannot decode and thus play the first sequence of frames without decoding (and preferably playing) the at least one frame of advertising data.

In an embodiment, advertising data is incorporated into predictively encoded, for example MPEG encoded, digital video representing a video feature such as a film or movie or television show or program or recorded video game footage by re-encoding a sequence or group of pictures of the video feature with reference to at least one frame of advertising data representing at least one advertisement so that the sequence of the video feature cannot be decoded without decoding the at least one frame of advertising data, thereby making it difficult, when the video feature is delivered to an end user by, for example, downloading or streaming over a network, for the end user to skip or delete the at least one advertisement from the video feature, without detrimentally affecting the video feature.

Where the data is video data, then the encoding process may be an MPEG (Moving Pictures Expert Group) process such as MPEG2 (& DVD), DivX (created by DivX Inc.), Xvid, H.263 or H.264/MPEG4-10 (an example of which is used the QuickTime™ encoding process), MPEG4-2, VC-1 (SMPTE 412M or WMV9) or any other video encoding process which exploits temporal redundancy in the video signal by using differential or predictive encoding.

The invention also provides the recording data itself and a recording medium carrying the recording data. The present invention also provides a computer-readable medium storing computer-readable instructions to program a processor to carry out the method.

BRIEF DESCRIPTION OF THE DRAWINGS

Embodiments of the present invention will now be described, by way of example, with reference to the accompanying drawings, in which:

FIG. 5*a* shows an example of an encoded video frame sequence or group of pictures prior to insertion of advertisement video data while FIG. 5*b* shows an example of an encoded video frame sequence after insertion of advertisement video data.

DETAILED DESCRIPTION OF EMBODIMENTS

Figure 1:
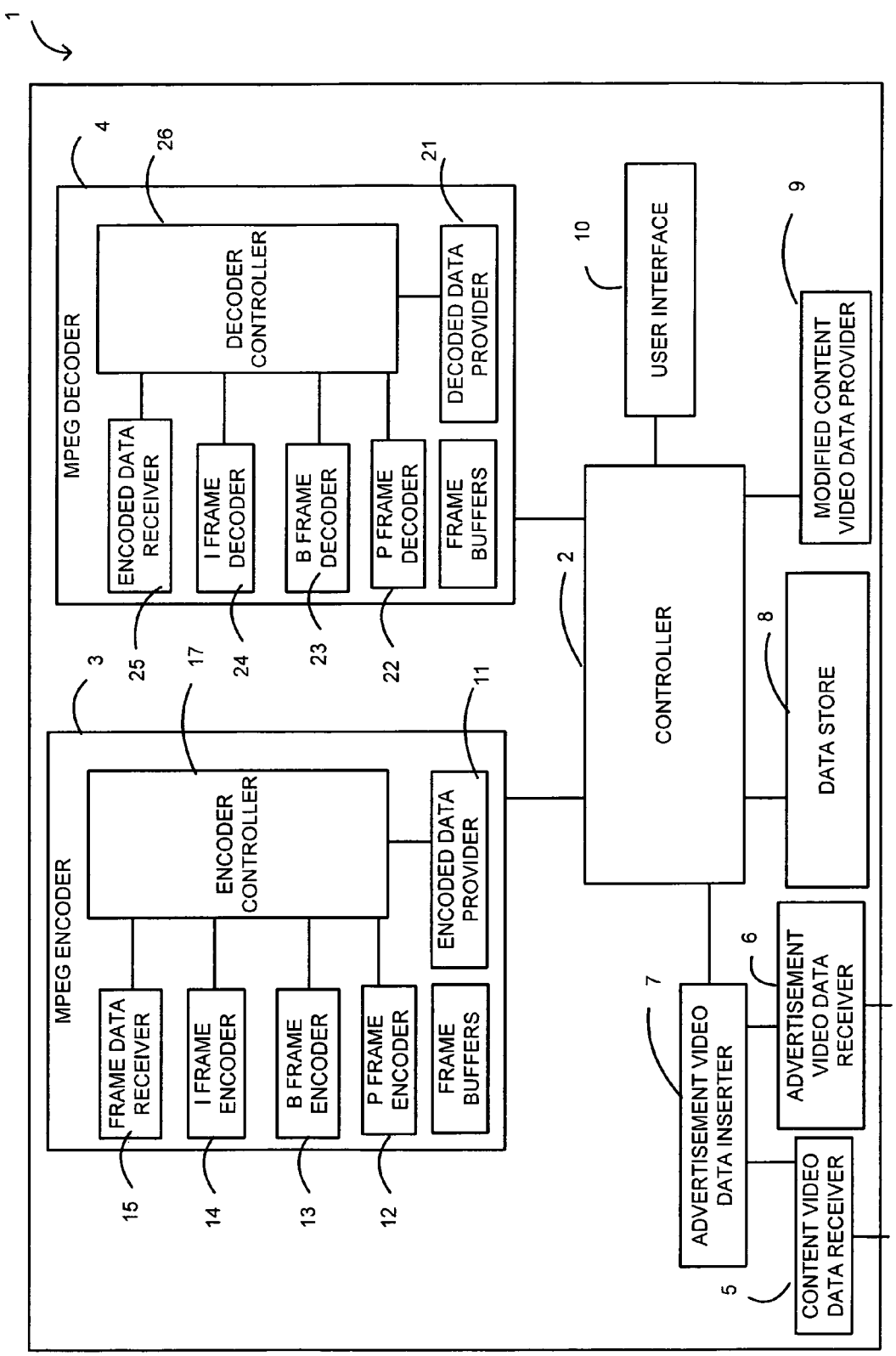
FIG. 1 shows a functional block diagram of apparatus for providing content data such as a video feature.

Referring now to FIG. 1, there is illustrated an example of apparatus 1 operable to provide encoded digital video data representing a video feature such as a film or movie or television show or programme or video game wherein the video data contains both content data and advertising data and wherein a sequence of frames of the content data is differentially or predictively encoded by reference to at least one frame of the advertising data. Such video data includes independently encoded frames (known in some encoding processes as Intra (I) frames) and differentially encoded frames encoded with reference to an earlier frame (such a differentially encoded frame being known in some encoding processes as a Predicted (P) frame) or to both an earlier and a later frame (such a differentially encoded frame being known in some encoding processes as a Bidirectional Predicted (B) frame). The frame of the advertisement data used to encode subsequent frames of the sequence of frames may be an I-frame or P-frame of the advertising data, Using a frame of the advertising data as a reference frame to re-encode a sequence of frames of the content data means that both that reference frame and any frame with respect to which that reference frame was encoded have to be decoded to enable decoding of the sequence of frames of the content data so making it difficult for an end user, without losing that sequence of frames of the content data and thus detrimentally affecting the video feature, to skip over the advertisements by 'jumping' in non-linear time, or for an end user to cut out the advertisements from previously downloaded digital content data.

The apparatus 1 has a controller 2 to control overall operation of the apparatus and an associated data store 8. The controller 2 is coupled to an encoder 3 and a corresponding decoder 4. As illustrated in FIG. 1, the encoder 3 has an encoder controller 17 to control its overall operation, a frame data receiver 15, an I frame encoder 14, a B frame encoder 13, a P frame encoder 12 and an encoded data provider 11 to output encoded data to the controller while the decoder 4 has a decoder controller 26 to control its overall operation, an encoded data receiver 25, an I frame decoder 24, a B frame decoder 23, a P frame decoder 12 and a decoded data provider 11 to output decoded data to the controller. Although shown separately to illustrate their functionality, the encoder 3 and decoder 4 will generally be provided as a CODEC configured to carry out any suitable differential or predictive encoding process. For example, the encoding process may be a MPEG (Moving Pictures Expert Group) process such as MPEG2 (& DVD), DivX (created by DivX Inc.), Xvid, H.263 or H.264/MPEG4-10 (an example of which is used the Quicktime™ encoding process), MPEG4-2, VC-1 (SMPTE 412M or WMV9), Real Media video, Real Media variable bitrates (RMVB) video, or any other differential or predictive encoding process. In the example shown, the encoder and decoder are configured to operate in accordance with an MPEG standard, for example the MPEG2 (ISO/IEC 13818) standard.

As illustrated in FIG. 1, the apparatus 1 also has a content video data receiver 5 to receive content data into which advertisement data is to be inserted, an advertisement video data receiver 6 to receive advertisement data to be inserted into content data, an advertisement video data inserter 7 to insert advertisement data into content data, and a modified content video data provider 9 to output modified content video data containing the advertisement data for subsequent delivery or streaming via a network such as the Internet or a telecommunications network using any appropriate protocol such as TCP/IP, UDP or the like. As another possibility or additionally, the modified content video data provider 9 may comprise an appropriate network connection to enable the modified content video data to be delivered or streamed directly to a network or end user.

The apparatus may also have a user interface 10 to enable a user to control at least some of the process, for example to decide the point in the content data at which the advertisement data is to be inserted.

The functional components shown in FIG. 1 may, as appropriate, be provided by hardware, firmware, software or any combination of these.

Figure 2:
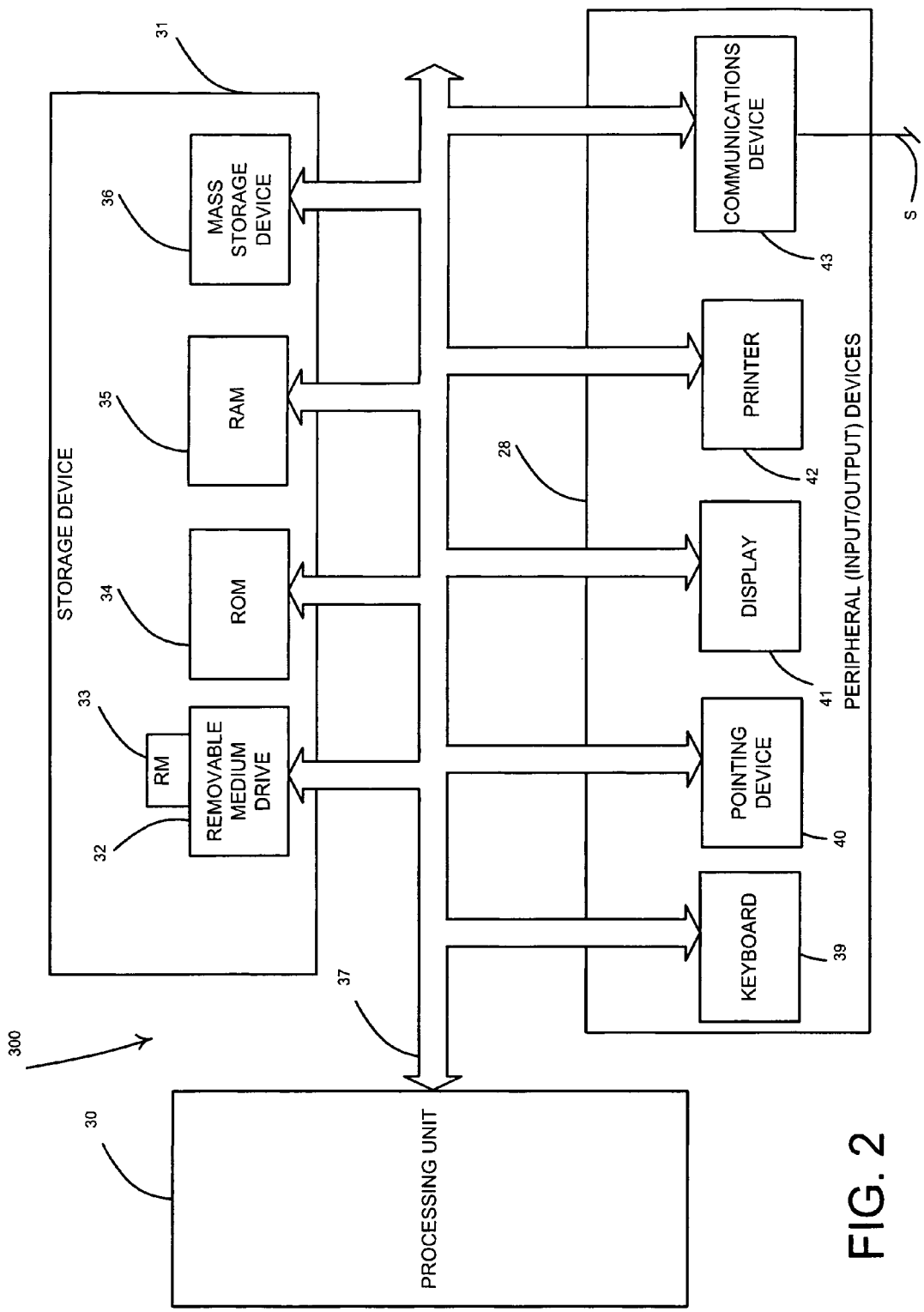
FIG. 2 shows a functional block diagram of computing apparatus that may be programmed to provide the apparatus shown in FIG. 1.

FIG. 2 shows a functional block diagram of computing apparatus 300 that may be programmed by program instructions to provide the apparatus shown in FIG. 1.

The computing apparatus 300 comprises a processing unit 30 coupled by one or more buses 37 to storage devices 31 which comprise a removable medium drive or port 32 for receiving a removable medium RM 33 (in this case a DVD drive for receiving a DVD and/or a DLT drive), a read only memory (ROM) 34, a random access memory (RAM) 35 and a mass storage device 36 such as a hard disc drive.

The bus 37 also couples the processing unit 30 to a number of peripheral input/output devices that may form the user interface 10 of FIG. 1, in this case a keyboard 39, a pointing device 40 and a display 41. The peripheral devices will generally include a communications device 43 to provide network communication to enable receipt of content and advertisement data and to enable, directly or indirectly, delivery of a video feature to an end user. The peripheral devices may also include a printer 42. The communications device 43 may be, for example, a MODEM, wired or wireless network card or the like for enabling the computing apparatus 300 to communicate over a network which may be the Internet but could alternatively or additionally be an intranet, a local area network, wide area network, a telecommunications network, or any other suitable form of network.

It will, of course, be appreciated that the storage devices and input/output devices may not comprise all of those shown in FIG. 2 and/or could comprise additional devices. For example, one or more further removable medium drives or ports, such as a floppy disc drive, a Flash memory drive and/or a USB port, may be provided and other or alternative input/output devices such as any one or more of a remote control, a microphone and a loudspeaker may be provided.

Figure 3:
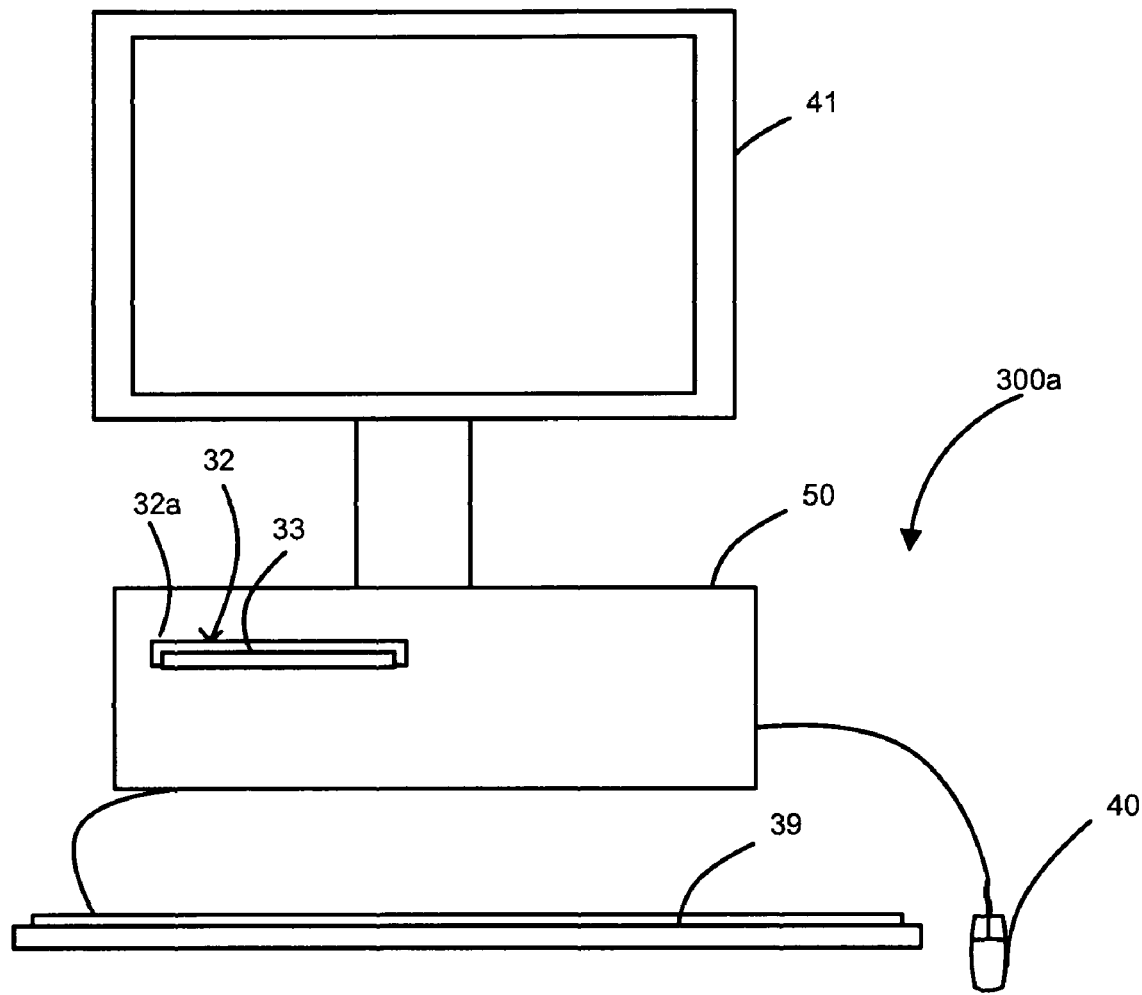
FIG. 3 shows a diagram illustrating an example of computing apparatus having the functionality shown in FIG. 2.

As shown diagrammatically in FIG. 3, the computing apparatus may be a personal computer or server 300a which has a main processor unit 50 containing the processing unit 30, storage devices 31 and user interface devices in the form, as shown, of a keyboard 39, mouse 40 and display 41. FIG. 2 shows a removable medium 33 extending from an insertion slot or port 32a.

The computing apparatus 300 or 300a may be programmed to provide the apparatus 1 shown in FIG. 1 by program instructions supplied by any one or more of the following routes:

pre-stored in the ROM 34 and/or or the mass storage device 36;
input by a user using an input device such as the keyboard 39 and/or the pointing device 40;
downloaded from a removable medium 33; and
supplied as a signal S via the communications device 43.

Of course, where apparatus has different physical components, then these may be provided by programming of corresponding respective computing apparatus.

Figure 4:
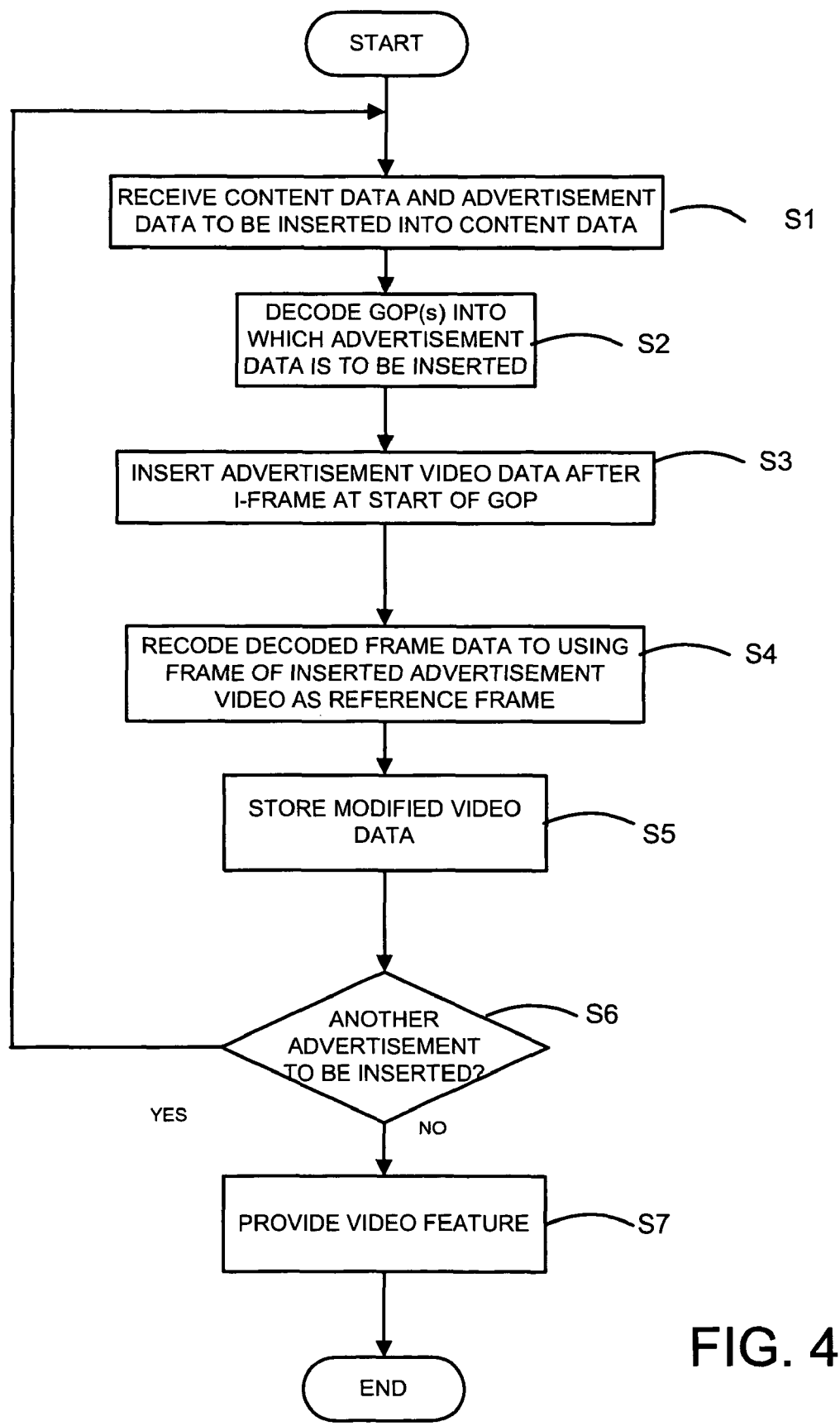
FIG. 4 shows a flow chart for explaining operations carried out by the apparatus shown in FIG. 1.

FIG. 4 and FIGS. 5a and 5b show a flow chart and diagrams, respectively, for explaining operations carried out by the apparatus shown in FIG. 1 to provide modified video content data where the video content data and the advertisement data are digital video data compressed using an MPEG 2 CODEC, although, as mentioned above a CODEC operating in accordance with a different standard such as MPEG2 (& DVD), DivX (created by DivX Inc.), Xvid, H.263 or H.264/MPEG4-10 (an example of which is used the Quicktime™ encoding process), MPEG4-2, VC-1 (SMPTE 412M or WMV9)), Real Media video, Real Media variable bitrates (RMVB) video, or any other suitable differential or predictive encoding process, may be used.

The above-mentioned coding processes exploit spatial or temporal redundancy in a video frame sequence by differentially or predictively encoding the image data for some frames with respect to one or more other frames to increase coding efficiency. Independently coded or I-frames are required periodically in the sequence to reset the decoder buffers and thus provide a degree of resilience to signal errors and dropouts in the digital video stream. Periodic inclusion of I-frames also permits previewing of the video stream when rapidly searching or seeking in either direction. Accordingly, in such coding processes, the video data is divided into groups of pictures (GOPs) each consisting of a sequence of frames comprising an I-frame followed by a sequence of differentially or predictively encoded frames which are encoded with respect to either a single earlier frame or to both an earlier and a later frame by forming predictions of blocks within a frame, using previously encoded blocks of other frames for reference. The differentially encoded frames may be Predicted frames (P-frames) which are predicted with reference to a temporally earlier I or P frame or Bidirectional Predicted frames (B-frames) which are predicted with reference to both a temporally earlier I or P frame and a temporally later I or P frame. As will be appreciated, in order to decode a B-frame, a decoder has to decode frames in an order different from different from the frame display order. In light of this, it is common to have a P-frame after every 2 or 3 B-frames, so that the video decoder need not store too many successive frames in its decode buffer, so reducing memory and computational complexity requirements for the hardware (and hence reducing cost). A group of pictures (GOP) thus starts with an I-frame, and has a number of P-frames and B-frames. A typical GOP may, for example, consist of an I-frame followed by a number of BBP or BBBP frame combinations, for example IBBPBBPBBP . . . (BBP) . . . BBP . . . I and so on.

The video data may be further compressed using lossy techniques such as quantization techniques and other psycho-visual techniques which may use, for example, a DCT (Discrete Cosine Transformation) or like to enable removal in the frequency domain of frequency components that are not perceptually significant for the viewer so that the total number of bits required to encode the picture can be reduced whilst avoiding significant perceptible degradation of image quality.

The above represents a simplified explanation of the coding process. For further information, reference should be made to the appropriate standards available via the corresponding standards body, for example via www.mpeg.org in the case of the MPEG2 coding process.

Modification of a group of pictures (sequence of frames) of a video feature such as mentioned above to incorporate advertisement data may be carried out in response to a specific user instruction input via the user interface 10 in FIG. 1, or automatically in accordance with instructions previously input to the controller 2. The video content data and the advertisement data may be pre-stored in the data store 8 or may be received via the content data receiver and advertisement video data receiver 5 and 6, respectively, from another apparatus, for example downloaded by the user from a network such as the Internet or other network or from a removable storage medium such as a DVD, memory stick, removable hard drive or the like.

The group of pictures into which the advertisement data is to be inserted may be selected by the user via the user interface 10 or may be predetermined by the controller 2 in accordance with predetermined instructions, for example, the controller 2 may be configured to cause advertisement data to be inserted at predetermined intervals during the play back time of the video feature, for example after 15 or 30 minutes playing time as would be usual for commercial television broadcasts.

FIG. 5a shows an example of an MPEG-encoded group of pictures (GOP) 300 into which advertisement data is to be inserted. The group of pictures 300 shown in FIG. 5a is of length nn-frames and has an I-frame followed by an integer number of a repeating B and P frame pattern, in the example shown the repeating pattern is BBP. The arrows on the diagram point from the predictively encoded frame towards the reference frame, that is towards the frame or frames from which a particular predicted B or P frame is constructed, so that, for example, an arrow points towards I-frame 200 from P frame 203, arrows point towards I-frame 200 and P-frame 203 from B-frame 201 and arrows point towards I-frame 200 and P frame 203 from B-frame 202 and so on. It will be understood from the above that in order to decode the GOP shown in FIG. 5a it is necessary to decode first the initial I-frame 200 of the GOP (because the other nn-1 frames have a direct or indirect dependency on the I-frame 200) and that, although temporally later in the sequence, P-frame 203 has to be decoded before B-frames 201 and 202 can be decoded because B-frames 201 and 202 have a bidirectional dependency upon I-frame 200 and P-frame 203. Each of the later P-frames 206, 209 in the GOP shown in FIG. 5a is differentially or predictively encoded using the temporally immediately preceding P-frame as its reference frame (for example P-frame 206 is encoded using P-frame 203 as its reference frame and P-frame 209 is encoded using P-frame 206 as its reference frame) whilst each of the later B-frames in the GOP shown in FIG. 5a is differentially or predictively encoded using the temporally immediately preceding P-frame and the temporally immediately succeeding P-frame as its reference frames (for example B-frames 204 and 205 are encoded using P-frames 203 and 206 as their reference frames and B-frames 207 and 208 are encoded using P-frames 206 and 209 as their reference frames).

When at S1 in FIG. 4 the apparatus 1 receives the video content data for a group of pictures (GOP) such as that shown in FIG. 5a and the advertisement data, then at S2 the controller 2 causes the decoder 4 to decode the P-frames and B-frames of the GOP into which the advertisement data is to be inserted and at S3 causes the advertisement video data inserter 7 to insert the MPEG encoded frames of the advertisement data after the I-frame at the start of the GOP.

FIG. 5b shows advertisement data 400 inserted after the initial I-frame 200 of the GOP shown in FIG. 5a. In this example, the advertisement data consists of the same pattern of I, P and B frames, namely an I-frame 401 followed by a two B-frames 402 and 403 and then a P frame 404. The advertisement data could consist of a different pattern of I, P and B frames or a repeating sequence of that pattern or a different pattern, for example.

The apparatus 1 causes at S4 the encoder 3 to re-encode the decoded B and P frames of the GOP using a selected frame of the advertisement data as a reference frame, in this example the selected frame is the only P-frame 402 of the advertisement data. Thus, in the example shown by FIGS. 5a and 5b, P-frame 203 of the GOP is re-encoded using P-frame 402 of the advertisement data as its reference frame whilst B-frames 201 and 202 of the GOP are re-encoded using P-frame 402 of the advertisement data and the re-encoded P-frame 203 as their reference frames. Each of the remaining P-frames in the GOP shown in FIG. 5a is differentially or predictively re-encoded using the temporally immediately preceding re-encoded P-frame as its reference frame whilst each of the later B-frames in the GOP is differentially or predictively re-encoded using the temporally immediately preceding re-encoded P-frame and the temporally immediately succeeding re-encoded P-frame as its reference frames. Thus, all of the differentially or predictively re-encoded frames of the GOP are, directly or indirectly, re-encoded with reference to the P-frame 402 of the advertisement data.

In the example shown by FIG. 5b, the controller 2 (or the user via the user interface 10) selects a P frame 402 of the advertisement data as the reference frame so that decoding of the GOP requires decoding of that P-frame, its reference frame and any reference frame of its reference frame. Thus, in order to decode the modified GOP shown in FIG. 5b it is necessary to decode first the initial I-frame 200 of the GOP (because the other nn-1 frames have a direct or indirect dependency on the I-frame 200) and then to decode the advertisement data I-frame 401 and then the advertisement data P-frame 402 because all of the B- and P-frames of the GOP are differentially encoded on the basis, directly or indirectly, of the advertisement data P-frame 402 which is in turn differentially encoded using the advertisement data I-frame 401 as its reference frame.

In the example shown in FIG. 5b, the advertisement data has only one P-frame. Where the advertisement data has more than one P-frame then, although any P-frame may be selected, selecting the last P-frame should have the advantage of maximising the number of frames of the advertisement data that have to be decoded before the GOP can be decoded. It may be possible to use the I-frame of the advertisement data as the reference frame for re-encoding although this would mean that only the I-frame of the advertisement data would have to be decoded before the GOP could be decoded.

As another possibility, two or more GOPs of the original video content may be combined into one (by re-encoding an existing I-frame to become a P-frame), thereby increasing the length of the video sequence which would be affected by removing the embedded advertisement.

MPEG protocols currently permit I-frames or P-frames to be used as reference frames. However, if allowable in the encoding scheme being used, then it may be possible to use a B-frame of the advertisement data as a reference frame for re-encoding the GOP.

At S5 the modified GOP is stored or buffered by the modified video data provider 9 ready for delivery to the end user via, for example a network such as a telecommunications network or the Internet, or a broadcast transmission or on a recording medium such as a DVD or other optical disc. At S6, the controller 2 checks whether another advertisement is to be inserted in another GOP of the same video feature and if so repeats the process so that, for example, one or more advertisements may be inserted so as to be displayed at intervals during playback of the content data, for example every 15 to 30 minutes during playback of the video feature.

Once all of the required advertisements have been inserted, then at S7 in FIG. 4 the video feature incorporating the modified video data is provided. This may involve forwarding the video feature directly to an end user by broadcast transmission or delivery or streaming over a network and/or may involve storage on a storage medium for later delivery and/or may involve recordal on a storage or recording medium (for example a DVD) to be delivered to the end user.

It will of course be appreciated that the functional components shown in FIG. 1 simply illustrate the provided functionality and should not be taken to imply that these functional components necessarily exist as discrete physical entities. Rather, the functionality may be provided by one or more physical components and, in the latter case, the functionality provided by a single functional component shown in FIG. 1 may be distributed between different physical components. In addition, different aspects of the functionality may not be identifiable as separate functionality.

What is claimed is:

1. Apparatus for providing encoded content data, the apparatus comprising:
    a content data receiver adapted to receive content data comprising a first sequence of frames defining a group of pictures and having a first content data frame which is independently encoded and a series of further content data frames encoded with reference to the first content data frame;
    an advertising data receiver adapted to receive advertising data comprising a second sequence of advertising data frames having a first advertising data frame which is independently encoded and a series of further advertising data frames encoded with reference to the first advertising data frame;
    a decoder to decode the series of further content data frames to provide a series of decoded further content data frames; and
    an encoder coupled to the data receiver and adapted to encode the series of decoded further content data frames with reference to at least one of the advertising data frames, wherein the independently encoded first advertising data frame immediately follows the independently encoded first content data frame, and wherein all differentially or predictively encoded frames, but no independently encoded frames, of the content data group of pictures following a predictively encoded frame of the second sequence are re-encoded with reference to the predictively encoded frame of the second sequence, and wherein a player of the encoded data frames cannot decode the first sequence of frames without decoding at least one frame of the advertising data.

2. Apparatus according to claim 1, wherein each of the first and second sequences of frames comprises at least one bidirectionally predictively encoded frame encoded with respect to at least one earlier frame and at least one later frame of the same sequence.

3. Apparatus according to claim 1, wherein the video content data and the advertising data are encoded using one of the following encoding processes: MPEG2 (& DVD), DivX, Xvid, H.263 or H.264/MPEG4-10, MPEG4-2, VC-1 (SMPTE 412M or WMV9), Real Media video, Real Media variable bitrates (RMVB) video.

4. Apparatus according to claim 1, wherein the series of further content data frames comprises a repeating pattern of P- and B-frames.

5. Apparatus according to claim 1, wherein the series of further content data frames comprises a repeating pattern of P- and B-frames and the series of further advertising data frames comprises the same pattern.

6. A method of providing encoded data to be decoded for playing by a decoder of a player, the method comprising:
    combining content data and advertising data; and
    producing modified content data by encoding at least part of the content data defining a group of pictures with reference to at least some of the advertising data and wherein all differentially or predictively encoded frames, but no independently encoded frames, of the content data group of pictures following a predictively encoded frame of the advertising data are re-encoded with reference to the predictively encoded frame of the advertising data, and wherein a player of the modified content data cannot decode that part of the modified content data without decoding at least one frame of the advertising data.

7. A method according to claim 6, wherein the data is digital video data.

8. A method according to claim 6, wherein the content data and advertising data are already encoded and the method further comprises decoding the at least part of the content data prior to encoding the at least part of the content data with reference to at least some of the advertising data.

9. A method according to claim 8, wherein:
    the content data comprises a first sequence of frames having a first content data frame which is independently encoded and a series of further content data frames encoded with reference to the first content data frame;
    the advertising data comprises a second sequence of advertising data frames having a first advertising data frame which is independently encoded and a series of further advertising data frames encoded with reference to the first advertising data frame;
    the method further comprises decoding the series of further content data frames to provide a series of decoded further content data frames; and
    producing modified content data by encoding at least part of the content data comprises re-encoding the series of decoded further content data frames with reference to at least one of the advertising data frames wherein the independently encoded first advertising data frame immediately follows the independently encoded first content data frame.

10. A method according to claim 6, wherein each of the first and second sequences of frames comprises at least one bidirectionally predictively encoded frame encoded with respect to at least one earlier frame and at least one later frame of the same sequence.

11. A method according to claim 9, wherein the content data and the advertising data are encoded using one of the following encoding processes: MPEG2 (& DVD), DivX, Xvid, H.263 or H.264/MPEG4-10, MPEG4-2, VC-1 (SMPTE 412M or WMV9), Real Media video, Real Media variable bit rate (RMVB) video.

12. A method according to claim 9, wherein the series of further content data frames comprises a repeating pattern of P- and B-frames and the series of further advertising data frames comprises the same pattern.

13. A method according to claim 9, further comprising delivering a video feature incorporating the modified content data to an end user by at least one of: transmission; supply over a network; on a recording medium.

14. A processor-readable non-transitory storage medium storing processor instructions to program a processor:
   to receive video content data comprising a first sequence of frames defining a group of pictures and having an independently encoded first content data frame and a series of further content data frames encoded with reference to the first content data frame;
   to receive video advertising data comprising a sequence of advertising data frames having an independently encoded first advertising data frame and a series of further advertising data frames encoded with reference to the first advertising data frame;
   to decode the series of further content data frames to provide a series of decoded further content data frames; and
   to encode the series of decoded further content data frames with reference to at least one of the advertising data frames wherein the independently encoded first advertising frame immediately follows the independently coded first content data frame, and wherein all differentially or predictively encoded frames, but no independently encoded frames, of the content data group of pictures following a predictively encoded frame of the sequence of advertising data frames are re-encoded with reference to the predictively encoded frame of the sequence of advertising data frames, and wherein a player of the encoded data frames cannot decode and thus play the first sequence of frames without decoding at least one frame of the advertising data.

\* \* \* \* \*